March 5, 1957
R. F. HEISER
2,784,303
VEHICLE LIGHTING
Filed June 23, 1954
2 Sheets-Sheet 2
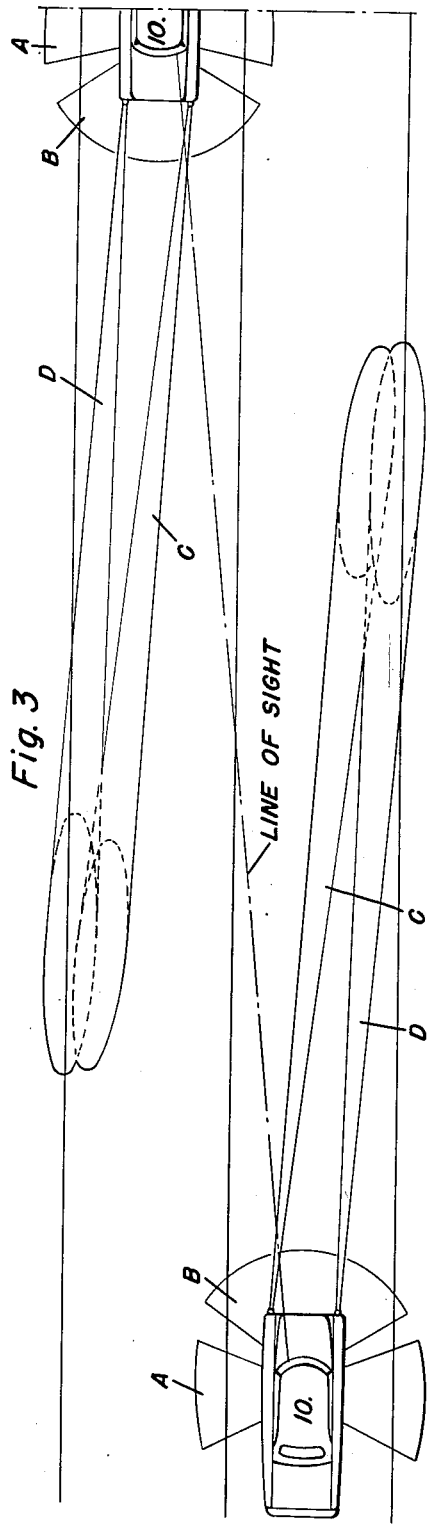
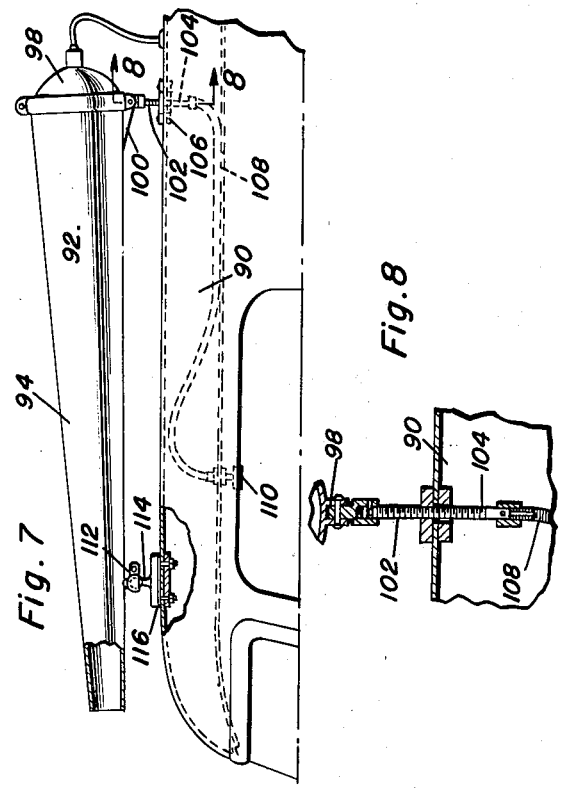
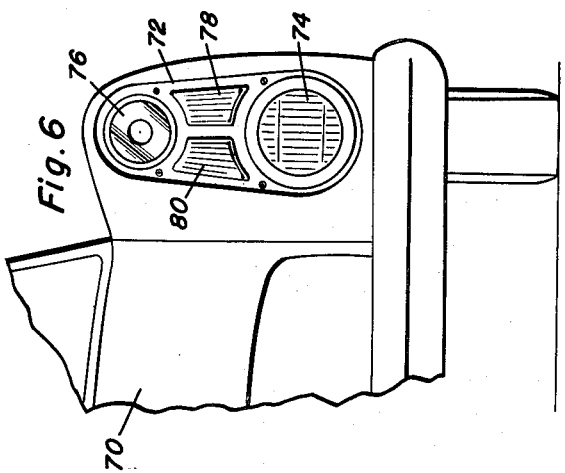
Robert F. Heiser
INVENTOR.

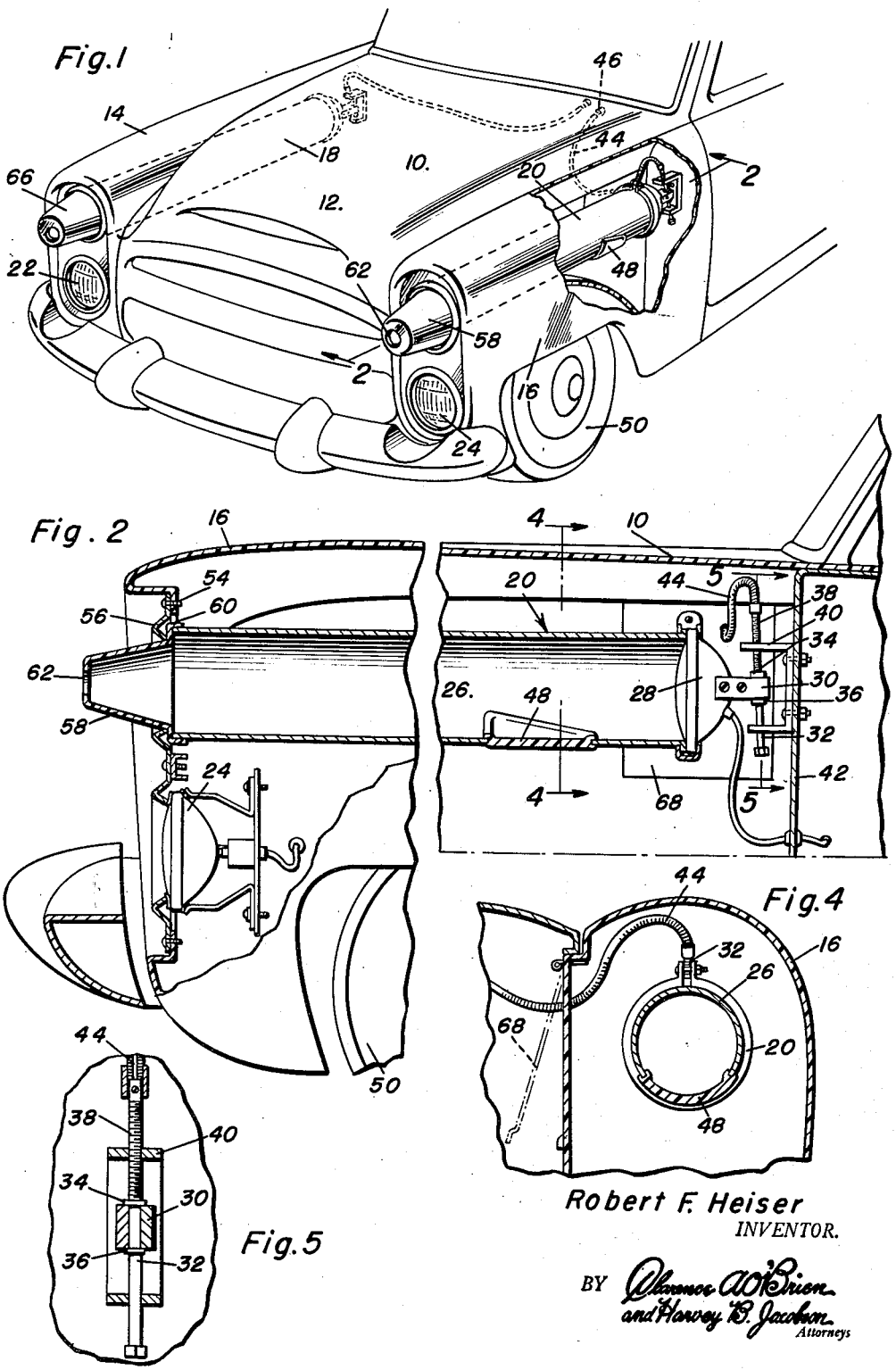

United States Patent Office 2,784,303
Patented Mar. 5, 1957

2,784,303
VEHICLE LIGHTING
Robert F. Heiser, Valparaiso, Fla.
Application June 23, 1954, Serial No. 438,673
2 Claims. (Cl. 240—7.1)

This invention relates to vehicle lighting and more particularly to novel arrangements of hidden lamps, colored lenses, and auxiliary lamps to provide more adequate illumination for motorists at night, especially during the hazardous approach and passing period of vehicles.

The primary object of the invention resides in the provision of a lighting arrangement which will eliminate all glare of reflected light from the eyes of an approaching motorist while directing intense spot-beams of light ahead of the driven vehicle and to controlled areas of the roadway. Thus, the roadway ahead, as well as the obstacles thereon, can be seen more readily by motorists than is possible with existing lighting arrangements.

A further object of the invention resides in the provision of colored illumination of the area under a vehicle as an aid to the seeing process. Thus, when the vehicle is viewed from any angle at night, the wheels and the periphery of the underside of the vehicle are silhouetted so that another motorist can more accurately judge the size and type of the vehicle as well as its location, speed and distance away.

Yet another object of the invention resides in the lighting arrangements which employ color in various shaped lenses so that the vehicle location is more clearly defined than present methods permit.

A further object of the invention resides in the provision of colored, hollow members and their attachment to truck, busses, automobiles, and other vehicles to obtain intense illumination in prescribed areas without the resulting blinding glare that is associated with reflectors of lamps.

Still further objects and features of the invention reside in the provision of a vehicle lighting arrangement which can be installed in various existing makes and models (as well as future designs) of vehicles. These arrangements are simple in construction and easy to install; they can be adapted for different sized vehicles; they can be installed in any location on the vehicle; and they employ novel means for directing and adjusting the path of the light beams emanating therefrom.

These, together with the various ancillary objects and features of the invention which will become apparent as the following description proceeds, are attained by this vehicle lighting arrangement, preferred embodiments of which are illustrated in the accompanying drawings by way of example only, wherein:

Figure 1 is a perspective view of a portion of a vehicle employing the invention, with parts of the vehicle being broken away to show the invention in greater detail;

Figure 2 is an enlarged vertical sectional view as taken along the plane of line 2—2 in Figure 1;

Figure 3 is a diagram illustrating the manner in which the invention causes the beams of light emanating from the lamps of the vehicle to be directed away from the approaching vehicle while providing the necessary illumination;

Figure 4 is a vertical sectional view as taken along the plane of line 4—4 in Figure 2;

Figure 5 is a sectional detail view of the means utilized for adjusting the lighting arrangement;

Figure 6 is a front elevational view of the front left fender showing a modified form of the invention employing parking, directional turn indicator lights, and high intensity flood lights;

Figure 7 is a side elevational view of a further modification of the invention as adapted to be installed at another location on vehicles and may be used as an auxiliary light; and Figure 8 is a sectional detail view as taken along the plane of line 8—8 in Figure 7.

With continuing reference to the accompanying drawings, wherein like reference numerals designate like reference parts throughout the various views, and with attention initially directed to Figures 1 through 5, it will be noted that this form of the invention is adapted to be installed on a vehicle 10, having a hood 12 covering the engine compartment thereof, between fenders 14 and 16. As shown, the invention is adapted to be utilized as a means for illuminating both the highway in front of the vehicle as well as the vehicle itself and includes the employment of devices 18 and 20 which are installed in the fenders 14 and 16, a lamp 28, and truncated conical members 66 and 58 attached thereto. In view of the fact that the devices 18 and 20 as well as 66 and 58 are substantially identical with each other, consideration will be directed particularly to the illuminating device 20 with its conical member 58 and lamp 28.

Other lamps such as 22 and 24 are installed for high intensity flood illumination of the roadway for country driving or when other vehicles are not approaching.

The device 20 is positioned in the fender 16 and is considerably elongated. This elongated tubular member generally indicated at 26 may be formed of any suitable material such as metal or plastics and has a lamp 28 attached thereto which may be of the sealed beam type which will converge the beam of light through the aperture 62. The lamp 28 carries a fitting 30, through which an adjusting rod 32 extends. The adjusting rod carries collars 34 and 36 which hold the fitting 30 therebetween with the rod 32 being rotatable within the fitting 30. The upper portion of the rod is threaded, as at 38, and is threadedly engaged within the bracket 40 secured to the fire wall 42 or other portion of the vehicle 10. The rod 38 extends upwardly and forwardly. A flexible cable 44 is attached to the rod 32 and is connected to a knob as indicated at 46 for use in rotating the cable 44 to further rotate rod 30 to adjust the lamp 28 by raising and lowering the lamp 28. The elongated tubular member 26 has a lens 48 in the lower portion thereof for directing light downwardly and to the rear of the front wheel of the vehicle 10.

Secured to the fender 16, as by fasteners 54, are clamp rings 56 which hold a truncated conical member 58 provided with an L-shaped flange 60 in alignment with and in engagement with the tubular member 26. It is to be recognized that suitable brackets or the like can be utilized as necessary for the support of the tubular member 26.

The conical member 58 is preferably formed from a colored, light transmitting, synthetic plastic material, and is provided with an eccentrically disposed aperture 62 in the forward end thereof, which is the portion of the conical section 58 of least cross section. The truncated conical member 58, therefore, acts as a shield to protect the oncoming motorist from the reflected light of the lamp 28. The lamp 28 with suitable elliptical reflector and plain clear lens (or parabolic reflector with converging lens) causes the light beam to converge at the focal point of the lamp. The smallest cross-sectional area of this converging beam, just before starting to diverge, is the point at which the aperture 62 is placed. The aperture 62 permits the full intensity of light to pass to the roadway ahead and to the right edge of the road so as not to impinge on the oncoming motorist.

Other light rays emanating from the lamp 28 will, of course, pass through the plastic material of the secondary lens 58, but will be diffused, colored, and of less intensity, thus showing the location of the vehicle to the oncoming motorist. The conical section 58 may be of a different color than that of the conical section 66 of the illuminating device 18, to thereby provide a further indication of the direction of travel of the vehicle 10, much in the same manner as directional lights on ships or other vessels are utilized. Further, because these conical sections extend outwardly of the vehicle, they can be seen from the side of the vehicle, thus assisting in the identification and location of the vehicle along with the under car flood light.

As can be seen in Figure 3, because of the light rays emanating from the colored lens 48, the front wheels as well as the periphery of the underside of the vehicle 10 will be silhouetted by the colored illuminating sectors A and B. Further, the light passing through the aperture 62 in the conical members 58 and 66 will be directed as indicated by the beam sectors C and D. By rotating the conical members 58 and 66 at the time of assembly, the eccentric apertures as at 62 can be positioned for the right or the left assembly to direct light beams C and D to different areas along the right edge of the road. It is to be recognized that the entire tubular member 26 can be adjusted within the fender at assembly so that finer adjustments of the illuminated area may be made by the operator of the vehicle. The angle provided by the attachment 30 limits the adjusting sectors C and D along a straight line formed by the right edge of the road when the vehicle is in normal attitude thereto.

The fender 14 as well as the fender 16 can, if desired, be formed from a translucent plastic material, if that is the material from which the vehicle 10 is fabricated. This will permit an illumination of the forward portion of the vehicle by reflected rays from the hidden lamp 28, as well as serving as the hollow member in which the lamp 28 is located. An access opening adapted to be closed by a door 68 can be provided for assuring ready access to the various portions of the lamp 28 and its adjusting mechanism.

In the embodiment of the invention shown in Figure 6, there is mounted on the vehicle 10 a composite headlight 72 which includes a primary lamp 74 for use as a high intensity flood lamp for country driving. The colored hollow member 58 with the aperture 62 as shown in Figures 1 and 2, as well as a parking light 80 and a directional turn indicator light 78, can be incorporated for use in conjunction with the head lighting arrangement 72 and in this form of the invention is designated at 76. Also, the lighting unit 72 may have its center line in a horizontal plane and of such design styling to meet the individual vehicle design on which it is installed. The aperture 62 may be of any shape, such as triangular, square, elliptical, or rectangular, so long as its cross-sectional area is large enough to pass the beam of light from the lamp 28 unobstructed.

It is to be noted further that the members 58 and 66 of Figure 1, as well as member 94 of Figure 7, may be hollow members of any cross-sectional shape and size so long as the aperture 62 therein may be held at a controlled distance from the lamp 28 in order that the converging beam of light may pass at the focal point of the lamp or lens. The combination of the composite assemblies as shown at 72 is highly attractive in appearance and may be installed with a minimum expenditure of labor.

In Figure 7 there will be noted a modified form of the invention which is adapted to be positioned at any location on the vehicle. For illustration, it is positioned on the roof of a vehicle generally indicated at 90. This lighting device consists of the elongated member 94 which, in this case, is a truncated conical member with the aperture 62 at the opposite end from the lamp 28. This elongated member 94 compares in purpose with the truncated conical members 58 and 66 of Figure 1, without the tube between.

The hollow member 94 is made of colored, translucent plastic material so that a portion of the reflected light from the lamp 28 passes through but appears less intense. This assists in the identification and location of the vehicle. Secured to the lamp is a fitting 100 to which there is attached the threaded end 102 of an adjusting rod 104, which threadedly extends through the bracket 106 mounted on the vehicle 90. A flexible cable 108 is attached to the rod 104 so that, upon rotation of the control knob 110, the cable 108 can be rotated, which in turn will rotate the rod 104 to raise and lower the elongated member 94 relative to the vehicle 90. The front end of the member 92 is adapted to have attached thereto a socket member 112 adapted to be engaged about a spherical member 114 being attached to a suitable bracket 116 on the vehicle 90. Utilizing the device 92, it will be noted that an auxiliary illuminating source has been provided which can be adjusted readily and the ball and socket joint formed by members 112 and 114 will support the illuminating device 92 while permitting the adjustment thereof.

From the foregoing, the construction and operation of the device will be understood readily and further explanation is believed unnecessary. However, since numerous modifications and changes will readily occur to those skilled in the art, it is not desired to limit the invention to the exact construction shown and described. Accordingly, all suitable modifications and equivalents may be resorted to, falling within the scope of the appended claims.

What is claimed as new is as follows:

1. A vehicle lighting arrangement comprising an elongated tubular member arranged in overlying relationship relative to a front wheel of a vehicle, a lamp secured in the rear end of said tubular member, at least one lensed aperture in the lower portion of said tubular member, means secured to said lamp for adjusting said lamp and the rear end of said tubular member, and a light transmitting colored truncated conical member rotatably secured to said tubular member, said conical member extending outwardly of the vehicle, said conical member having an eccentrically disposed aperture in the front end thereof so that the position of said aperture relative to the vehicle can be adjusted upon rotation of said conical member.

2. A vehicle lighting arrangement comprising an elongated tubular member arranged in overlying relationship relative to a front wheel of a vehicle, a lamp secured in the rear end of said tubular member, at least one lensed aperture in the lower portion of said tubular member, means secured to said lamp for adjusting said lamp and the rear end of said tubular member, said means comprising a bracket, a fitting attached to said lamp, an adjusting rod threadedly secured in said bracket and engaging said fitting, a flexible cable secured to said adjusting rod for rotating said rod, said rod extending angularly upwardly and forwardly, and a light transmitting colored truncated conical member rotatably secured to said tubular member, said conical member extending outwardly of the vehicle, said conical member having an eccentrically disposed aperture in the front end thereof so that the position of said aperture relative to the vehicle can be adjusted upon rotation of said conical member.

References Cited in the file of this patent
UNITED STATES PATENTS

| 1,262,394 | Schickerling | Apr. 9, 1918 |
| 1,540,476 | Hoffman et al. | June 2, 1925 |
| 1,667,949 | Ring | May 1, 1928 |
| 1,965,869 | Walch | July 10, 1934 |
| 2,006,125 | Barber | June 25, 1935 |
| 2,066,981 | Koca | Jan. 5, 1937 |